US007742846B2

United States Patent
Fanciullo et al.

(10) Patent No.: US 7,742,846 B2
(45) Date of Patent: Jun. 22, 2010

(54) SURFACE CONTACT OVERRIDE LANDING SCHEME FOR A FBW ROTARY-WING AIRCRAFT

(75) Inventors: Todd M. Fanciullo, Tucson, AZ (US); Paul Morphy, Williamsville, NY (US); Lorren Stiles, Palm City, FL (US); Alex Faynberg, Cheshire, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 987 days.

(21) Appl. No.: 11/446,464

(22) Filed: Jun. 2, 2006

(65) Prior Publication Data

US 2007/0282493 A1 Dec. 6, 2007

(51) Int. Cl.
*G05D 1/00* (2006.01)
(52) U.S. Cl. .................. 701/4; 701/2; 701/3; 701/8; 701/9; 701/11; 244/11; 244/13; 244/17.11; 244/17.23; 244/175; 340/5.2; 340/945; 340/961; 340/963; 340/970; 342/29; 342/30; 342/34; 342/36
(58) Field of Classification Search .............. 701/3, 701/4, 7, 2, 8, 911, 12.1, 14, 33, 120, 301; 244/12.3, 223, 234, 236, 181, 17.13, 17.11, 244/17.23, 175, 189, 190, 195, 220, 235; 364/434, 424.01; 340/5.2, 945, 946, 961, 340/963, 970; 342/29, 30, 36, 34; 146/33, 146/128

See application file for complete search history.

(56) References Cited

U.S. PATENT DOCUMENTS

| 3,938,320 | A | * | 2/1976 | Nelson | 60/790 |
|---|---|---|---|---|---|
| 4,293,840 | A | | 10/1981 | Hadari | |
| 4,355,294 | A | | 10/1982 | Ben-David et al. | |
| 4,379,678 | A | * | 4/1983 | Carlock et al. | 416/98 |
| 4,494,061 | A | * | 1/1985 | Kaye | 318/628 |
| 4,767,085 | A | * | 8/1988 | Boudreau et al. | 244/182 |
| 4,956,780 | A | * | 9/1990 | Sankrithi et al. | 701/16 |
| 4,987,413 | A | | 1/1991 | Grove | |
| 5,001,646 | A | * | 3/1991 | Caldwell et al. | 701/7 |
| 5,124,938 | A | | 6/1992 | Algrain | |
| 5,156,363 | A | * | 10/1992 | Cizewski et al. | 244/223 |
| 5,209,429 | A | * | 5/1993 | Doolin et al. | 244/17.11 |
| 5,222,691 | A | | 6/1993 | Gold et al. | |
| 5,327,161 | A | | 7/1994 | Logan et al. | |
| 5,418,858 | A | | 5/1995 | Shoureshi | |

(Continued)

OTHER PUBLICATIONS

Bao et al., Vision-based horizon extraction for micro air vehicle flight control, 2005, IEEE, p. 1067-1072.*

(Continued)

*Primary Examiner*—Khoi Tran
*Assistant Examiner*—McDieunel Marc
(74) *Attorney, Agent, or Firm*—Carlson, Gaskey & Olds PC

(57) ABSTRACT

A method of transitioning from a complex response flight state to a ground operation control state. Pilot intent is determined through collective position information to control the transition. An independent cockpit switch activates an emergency surface contact transition function for use with a fly-by-wire (FBW) flight control system. Once the surface contact transition function is active, FBW control laws transition from a fully augmented flight state, through an augmentation deactivation state and into the surface contact state.

19 Claims, 2 Drawing Sheets

U.S. PATENT DOCUMENTS

| | | | |
|---|---|---|---|
| 5,428,543 | A | 6/1995 | Gold et al. |
| 5,615,119 | A | 3/1997 | Vos |
| 5,666,110 | A | 9/1997 | Paterson |
| 5,713,438 | A | 2/1998 | Rossetti et al. |
| 5,722,620 | A | 3/1998 | Najmabadi et al. |
| 5,738,300 | A | 4/1998 | Durand |
| 5,746,398 | A * | 5/1998 | Rollet et al. ................ 244/223 |
| 5,777,871 | A * | 7/1998 | Wise ........................... 700/29 |
| 5,819,188 | A | 10/1998 | Vos |
| 5,826,833 | A | 10/1998 | Evans et al. |
| 5,951,608 | A | 9/1999 | Osder |
| 6,189,836 | B1 | 2/2001 | Gold et al. |
| 6,259,379 | B1 | 7/2001 | Paterson et al. |
| 6,961,445 | B1 | 11/2005 | Jensen et al. |
| 7,095,488 | B2 * | 8/2006 | Jamieson et al. ........... 356/5.01 |
| 2007/0034734 | A1 * | 2/2007 | Yoeli ......................... 244/12.1 |
| 2007/0050140 | A1 * | 3/2007 | Matuska et al. ............. 701/301 |

OTHER PUBLICATIONS

Komfeld et al., Preliminary flight tests of pseudo-attitude using single antenna GPS sensing, 1998, IEEE, p. E56-1-E56-8.*

Yeh, Triple Triple Redundant 777 Primary Flight Computer, 1996, Internet. p. 293-307.*

Oosterom, Soft Computing Applications in Aircraft Sensor Management and Flight Control Law Reconfiguration, 2002, IEEE, p. 125-139.*

Kowai, C-17 Flight Control System, 1992, Ieee, p. 1-6.*

PCT International Search Report and written opinion mailed Sep. 17, 2008.

* cited by examiner

SURFACE CONTACT OVERRIDE LANDING SCHEME FOR A FBW ROTARY-WING AIRCRAFT

BACKGROUND OF THE INVENTION

The present invention relates to a fly by wire flight control system for a rotary-wing aircraft, and more particularly to a full authority fly by wire flight control system which accommodates an emergency landing scenario.

Fly By Wire [FBW] flight control systems are increasingly state of the art in the control of rotary-wing aircraft. The highly specialized control laws in a FBW flight control system provide functionality for all states of aircraft operation including ground state operation. Rotary-wing aircraft with a partial authority flight control augmentation system do not require mode changes when the aircraft is on the ground, because there is little potential for unwanted feedback into the control system. A full authority FBW flight control system, however, requires a specific surface contact mode to prevent undesired feedback into the control system. The surface contact mode transitions between a fully augmented normal flight control state and a ground state once the majority of the aircraft weight is supported on the ground.

The surface contact mode is initiated through weight-on-wheels switches on the landing gear. As the aircraft touches the ground, landing gear struts compress, and switches activate the ground contact state. There are, however, landing scenarios where the weight-on-wheels switches will not function such as when the landing gear cannot be extended due to a malfunction, or when the aircraft must be landed in water, e.g., ditched.

Accordingly, it is desirable to provide a fly-by-wire flight control system which can transition into a ground contact state during an emergency landing scenario when weight-on-wheel switches may not be usable. This state would be referred to as a surface contact override transition mode.

SUMMARY OF THE INVENTION

A FBW flight control system according to the present invention provides a control law structure that satisfied military handling qualities and civil certification requirements. A surface contact transition function of the flight control system controls the transition from a relatively complex augmented response flight state to a controlled ground operation state.

The surface contact override transition function is enabled by pilot action such as a through a cockpit switch. Once the surface contact override transition function is active, the control laws transition through three different states. These states are the fully augmented flight state, augmentation deactivation state and the surface contact state.

Fully Augmented Flight State

The normal flight state includes augmented full authority flight control laws. This augmentation is what must be disabled when the aircraft becomes constrained by the landing surface.

Augmentation Deactivation State

This state is dedicated to disabling the augmentation in the flight control system and transitioning to a proportional surface contact control scheme. The transition is initiated by identification of pilot intent to descend and accomplished through a relationship to lagged collective stick position. The collective position is lagged to be certain that the pilot actually intends to descend. A predetermined threshold is compared to the current collective position relative to the position at surface function transition function engagement or a predetermined absolute position. As the threshold is breached, the augmentation is disabled over an associated time period so that upon surface contact little or no augmentation remains.

Surface Contact and "Heavy" State

The collective position is also employed to determine when the aircraft is "heavy"—the majority of aircraft weight supported upon a surface. A comparator determines when the collective stick position is low enough, by comparing lagged stick position to a predetermined threshold relative to the position at surface contact transition function engagement or a predetermined absolute position to signal the "heavy" state such that the rotor control system may then be transitioned to a neutral condition.

The present invention therefore provides a fly-by-wire flight control system which can transition into ground contact state during an emergency landing scenario in which weight-on-wheel sensors may not be usable.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
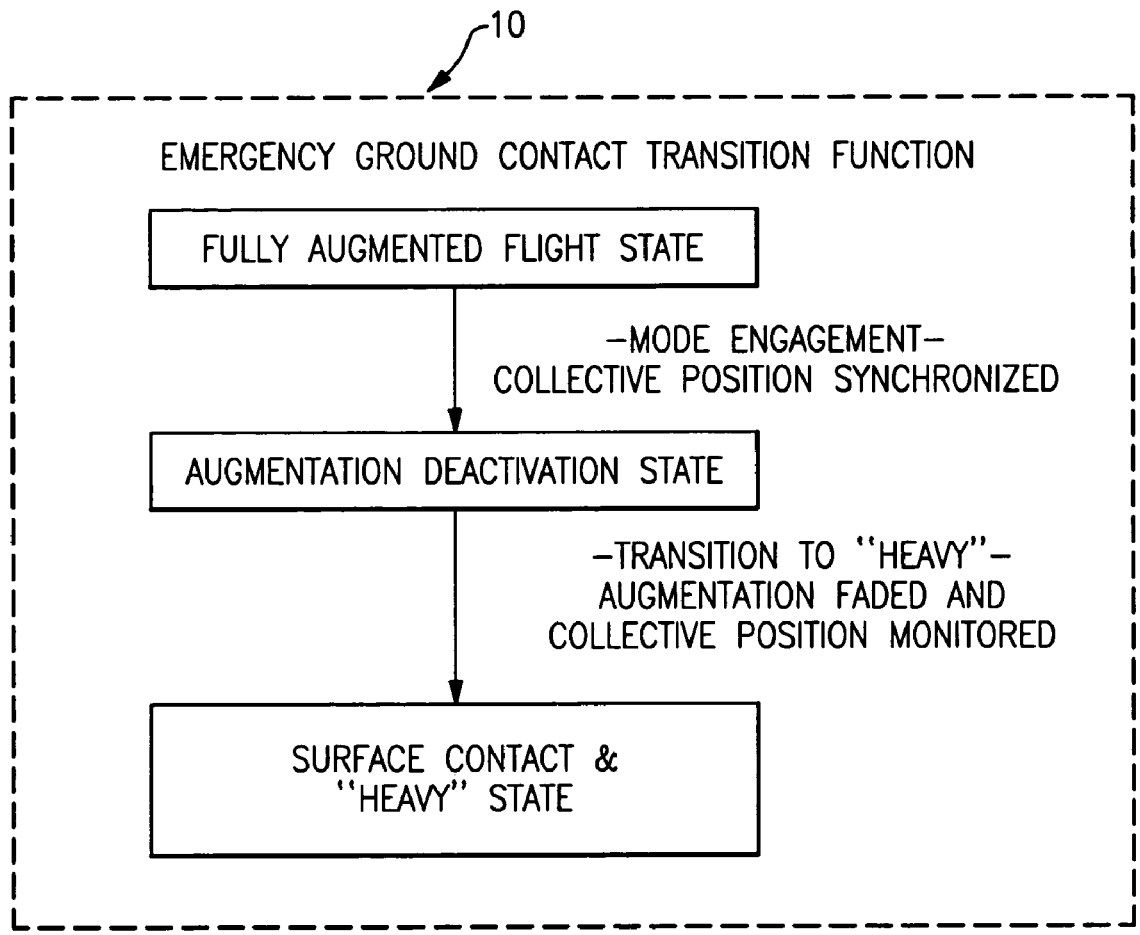
FIG. 1 is a flow diagram of a surface contract transition function for a FBW flight control system.
Figure 2:
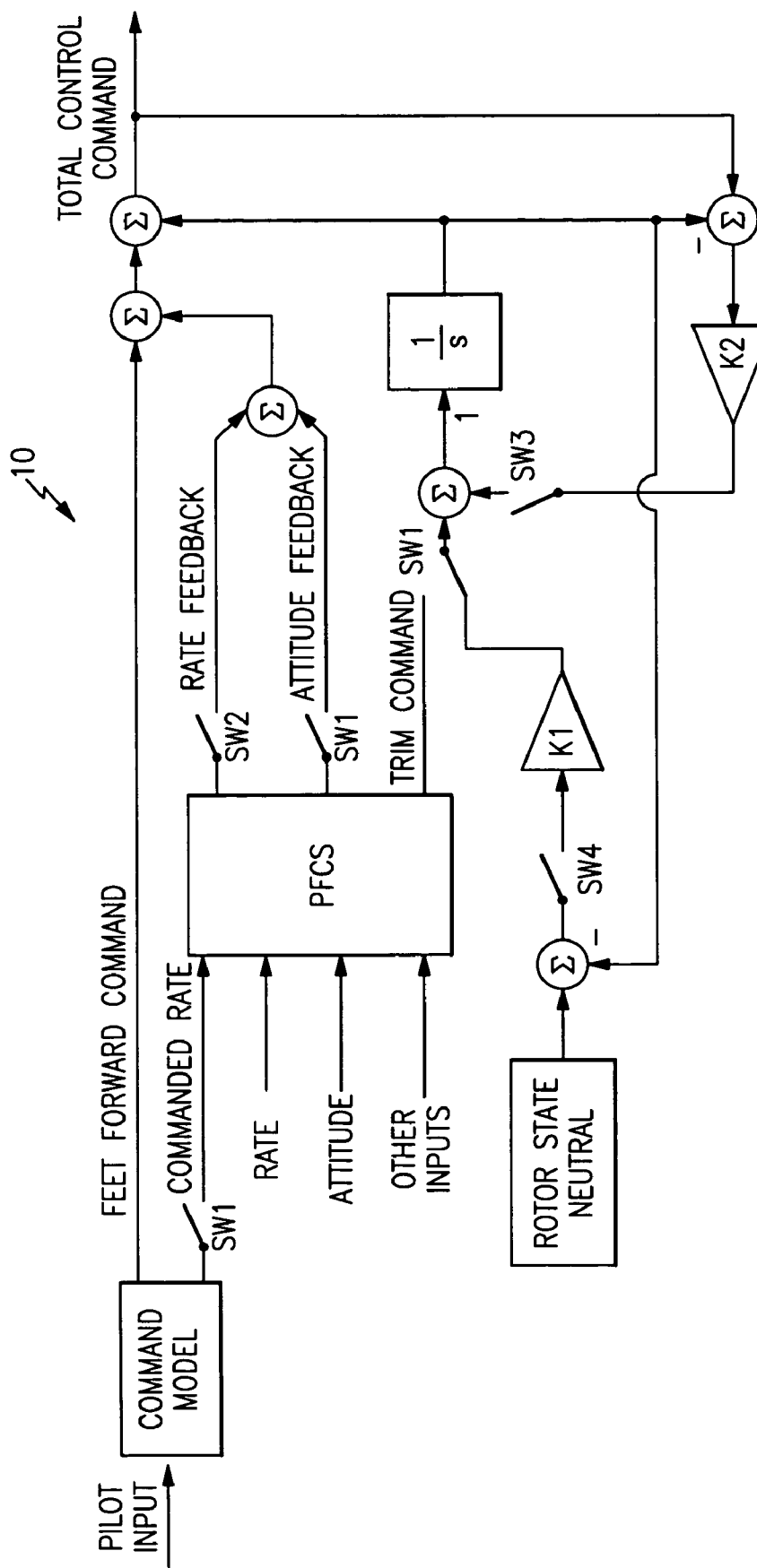
FIG. 2 is a schematic representation of a FBW flight control system for use with the surface contact transition function.

FIG. 1 illustrates a flow diagram for an emergency surface contact transition function for use with a fly-by-wire (FBW) flight control system 10 (illustrated schematically in FIG. 2). The flight control system 10 is represented by, but not limited to, a Primary Flight Control System (PFCS). Other automatic modes, (AFCS) can be added as requirements dictate.

The PFCS provides feed-forward and feedback paths to achieve the desired response characteristics and to compensate for disturbances acting on the aircraft. It should be understood that the surface contact transition function is primarily utilized for control of a main rotor system of a rotary-wing aircraft, however, other aircraft such as tilt-rotor aircraft will also benefit herefrom.

Pilot inputs are interpreted by the command model and are converted into commanded rate and feed forward commands. The PFCS receives the commanded rates and "other inputs," such as airspeed, altitude, vertical velocity, angular rates, altitude and such like. Commanded rate is compared with actual rate and rate error is generated.

Commanded rate also generates commanded attitude. Commanded attitude is compared with actual attitude and attitude error is generated. The "other inputs" may be utilized for scheduling and other functionality. The PFCS operates on the error signals and produces proportional and integral commands. The proportional commands are represented by the rate feedback and attitude feedback signals. The integral commands are represented by trim command. It should be understood that various active flight control systems will be usable with the methodology of the present invention.

The fly-by-wire flight control system 10 typically includes swashplate controllers for pitch and roll control which are described as "unique trim" controllers. Unique trim permits a flight control system (stick) which need not be proportional to the swashplate controller position but remains in a center (detent) position unless a maneuver is being commanded. The flight control computer (FCC) provides unique trim with a trim follow-up function that activates when the stick is out of detent. The FCC trim follow-up function controls the swashplate angle when the stick is moved out of detent and holds the swashplate in that position until another pilot stick input is applied. This differs from proportional control in which the stick position corresponds directly to swashplate angle, and the pilot's control stick may be physically retained in place by a retention system such as a magnetic brake mechanism which the pilot may selectively activate/release.

In flight, trim follow-up operates well because the aircraft responds to the change in swashplate angle—causing the flight path to change correspondingly. Trim follow-up typically acts on the attitude of the aircraft so the aircraft stays where it is put after a control input. Workload for the pilot is reduced because there is no longer a requirement to push a button to cause a maneuver and find the proper location to maintain the new state (attitude). The total amount of control travel is also reduced because proportionality is not required.

When in contact with the ground, however, trim follow-up may hinder control of the aircraft because the ground resists aircraft motion. In other words, if the trim follow-up control laws are of the type that change attitude, and the ground resists that attitude change, the trim follow-up function tends to "run away" trying to satisfy the pilot's input. This may result in excessive control movement, for example, excessive swashplate angle. If allowed to "run away" enough, structural problems may occur or the aircraft may upset while on the ground, e.g. dynamic rollover.

To convey that the aircraft is in a ground contact state to the aircraft flight control system, weight-on-wheels (WOW) switches on the landing selectively disable the trim follow-up functions. Preferably, the trim follow-up functions are disabled as appropriate by axis. The aircraft flight control system then essentially operates with pseudo proportional control laws such that the pilot receives essentially direct feedback between stick input and control displacement. That is, the pilot receives direct feedback as to, for example, commanded swashplate angle as related to the amount of stick input applied out of detent. The WOW switches and disablement by axis assures ground contact transition is not affected too early so that the features of trim follow-up are minimally impacted while the aircraft is still in flight such that pilot workload is not unnecessarily increased. Furthermore, the feed forward command changes based on mode of operation, i.e., the dynamics which calculate feed forward are different for flight and ground control laws.

Should a situation occur where the WOW switches are unavailable, such as when the landing gear cannot be extended due to a malfunction or when the aircraft must be landed in the water, e.g., ditched, the surface contact transition function assures that the trim follow-up functions as well as other systems may still be properly controlled to facilitate safe ground operation.

Figure 3:
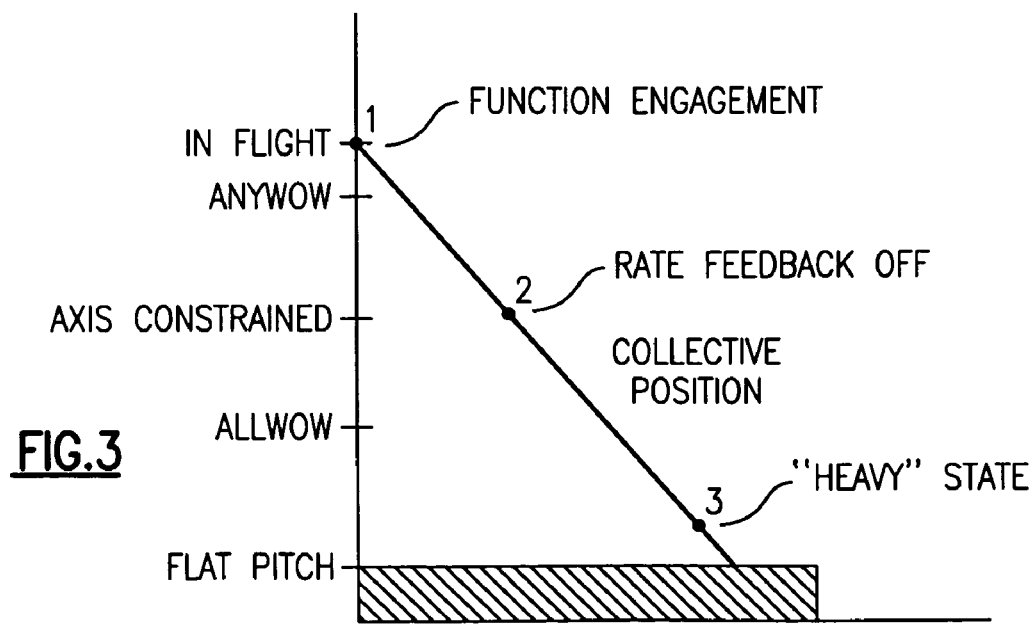
FIG. 3 is a graphical representation of the surface contact transition function related to WOW switch references.

Referring to FIG. 3, the surface contact transition function (illustrated graphically) emulates the functions of the WOW switches. The surface contact transition function utilizes a lagged collective position to estimate where in the landing profile transition away from trim follow-up should occur such as normally performed via WOW switches.

During an emergency landing situation where the WOW switches are not expected to be available, the pilot will manually initiate a ground transition by activation of a flight mode override switch in the cockpit (point #1) which initiates operation of the surface contact transition function. Prior to point #1 the aircraft is not in contact with the ground, and all flight control laws operate in their normal fully augmented flight state.

In order to reduce pilot workload, instead of simply dropping the flight controls laws into the ground state immediately upon activation of the flight mode override switch, the lagged collective position is utilized to estimate proximity to the ground. A gradual transition to the ground control laws during landing (collective reduction) is then performed to retain as much of the workload-reducing flight control law functions as possible until the last possible moment in the landing profile.

At point #1, the flight mode override switch is activated. After the flight mode override switch is activated and collective reduction is identified thereafter, trim follow-up is disabled, attitude feedback is turned off, and control system sensitivity begins to be reduced. Between Point #1 and point #2, the emergency surface contact transition function emulates the WOW switch system when there is any weight on any gear. That is, as collective is reduced after the flight mode override switch is activated, the system emulates an ANYWOW condition. Under an ANYWOW condition, SW1 is open (FIG. 2) which removes commanded rate and switches in the damped mode (commanded rate equal to zero). Feed forward is still operable and operates in a "stick to head" pseudo-proportional mode while attitude feedback and trim command are disconnected. Switch SW3 operates to control the automatic trim follow-up integrator. Switch SW4 remains open. Preferably, the automatic trim follow-up integrator is held to its last fly state value, unless the direction of movement of the trim follow-up integrator is toward the ground state neutral position. When the integrator moves toward ground state neutral position, a lower rate of trim follow-up is used. The movement of the integration is axis dependent in response to a pilot command (i.e., stick out of detent).

In addition, feed forward shaping changes to proportional control on all three axes. The AFCS attitude hold commands and trim transfer may also be inhibited. The remaining control law augmentation becomes only the rate feedbacks contained in the PFCS control laws. Pitch and roll rate damping are preferably only enabled when AFCS is engaged.

As collective is further reduced, all rate feedback is disabled at point #2. Point #2 emulates an axis constrained condition which generally emulates when an aircraft axis is constrained by two gear touching down. Switch SW2 (FIG. 2) is now opened and rate feedback is gradually eliminated. Now, the flight control system will operate in "stick to head" mode (true proportional) with no rate damping. Switch SW3 still operates as described above. Switch SW4 is still open.

As the collective is still further reduced from point #2 toward point #3, the surface contact transition function (FIG. 1) of the flight control system 10 transitions the flight control laws to a neutral state which emulates an ALLWOW condition which essentially equates to contact on all WOW switches. Point #3 occurs essentially when collective is lowered to the "heavy state" which is typically just prior to flat pitch. Switch SW4 (FIG. 2) is now closed to drive the rotor system to the neutral ground state position. Preferably, all transitions performed by the surface contact transition function are "faded" over a relatively short period of time—typically 5-10 seconds—such that the automatic trim follow-up integrators are slowly and fully transitioned to the ground state neutral position to provide a smooth transition therebetween.

It should be understood that the surface contact transition function may be utilized with other identification systems such as water contact sensors to further refine the response. Furthermore, other flight control laws may be integrated into the surface control transition function by, for example only, reducing authority of the FBW control laws to be comparable with the authority of a proportional surface contact control scheme.

It should be understood that relative positional terms such as "forward," "aft," "upper," "lower," "above," "below," and the like are with reference to the normal operational attitude of the vehicle and should not be considered otherwise limiting.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of transitioning a Fly-By-Wire flight control system to a ground state comprising the steps of:
   (A) reducing a flight control augmentation in response to a reduction in a collective pitch position; and
   (B) identifying a first collective position which is less than a collective position at said step (a); and
   (C) disabling a trim follow-up flight control law function in response to said step (b).

2. The method as recited in claim 1, further comprising the step of:
   (B) identifying a pilot input which initiates a surface contact transition function prior to said step (A).

3. The method as recited in claim 1, further comprising the steps of:
   (a) identifying a pilot input which initiates a surface contact transition function;
   (b) identifying a first collective position which is less than a collective position at said step (a); and
   (c) disabling a trim follow-up flight control law function in response to said step (b).

4. The method as recited in claim 3, further comprising the steps of:
   (d) identifying a second collective position; and
   (e) reducing a rate feedback flight control law function in response to said step (d).

5. The method as recited in claim 4, further comprising the steps of:
   (f) identifying a third collective position less than the second collective position; and
   (g) transitioning the flight control law to a neutral state in response to said step (f).

6. The method as recited in claim 1, wherein reducing the flight control augmentation in response to the reduction in the collective pitch position occurs during aircraft flight.

7. A method of transitioning a Fly-By-Wire flight control system to a ground state comprising the steps of:
   (A) identifying a pilot input which initiates a surface contact transition function;
   (B) monitoring a collective pitch position; and
   (C) reducing a flight control augmentation in a lagged manner in response to a reduction in the collective pitch position,
   (D) identifying a first collective position which is less than a collective position at said step (c); and
   (E) disabling a trim follow-up flight control law function in response to said step (D).

8. The method as recited in claim 7, wherein said step (C) further comprises:
   (a) transitioning a flight control law to a proportional response.

9. The method as recited in claim 7, wherein said step (C) further comprises:
   (a) transiting a flight control law to a damped mode.

10. The method as recited in claim 7, wherein said step (C) further comprises:
    (a) transiting a feed forward command for a flight control law to a pseudo-proportional mode.

11. The method as recited in claim 7, wherein said step (C) further comprises:
    (a) reducing a trim follow-up function of a flight control law.

12. A method of transitioning a Fly-By-Wire flight control system to a ground state comprising the steps of:
    (A) initiating a surface contact transition function;
    (B) identifying a first collective position which is less than a collective position at said step (A);
    (C) reducing a trim follow-up function of a control law in response to said step (B);
    (D) identifying a second collective pitch position less than the first collective pitch position;
    (E) reducing a rate feedback of the control law in response to said step (D)
    (F) identifying a third collective pitch position less than the second collective pitch position; and
    (G) transitioning the flight control law to a neutral state in response to said step (F).

13. The method as recited in claim 12, wherein said step (B) further comprises:
    (a) holding an integrator of the trim follow-up function to a state at said step (A).

14. The method as recited in claim 13, wherein said step (B) further comprises:
    (b) reducing attitude feedback of the control law until disabled after a period of time.

15. The method as recited in claim 12, wherein said step (C) further comprises:
    (a) transitioning the flight control law to a proportional response.

16. The method as recited in claim 12, wherein said step (E) further comprises:
    (a) reducing the rate feedback of the control law until disabled after a period of time.

17. The method as recited in claim 16, wherein said step (E) further comprises:
    (b) operating the control law in a proportional mode with no rate feedback.

18. The method as recited in claim 12, wherein said step (A) further comprises:
    (a) initiating the surface contact transition function via pilot input.

19. The method as recited in claim 12, wherein said step (A) occurs during aircraft flight.

* * * * *